United States Patent Office 3,102,826
Patented Sept. 3, 1963

3,102,826
POROUS MEMBRANES AND METHODS OF MANUFACTURING THESE MEMBRANES
Gilberte Moutaud, née Renault, Neuilly-sur-Seine, and Jean Parisot, Argenteuil, France, assignors to Commissariat a l'Energie Atomique, Paris, France, a state administration of France
No Drawing. Filed Oct. 14, 1958, Ser. No. 767,038
Claims priority, application France Oct. 15, 1957
4 Claims. (Cl. 117—132)

In the prior patent application Ser. No. 660,344, filed May 20, 1957, for "Porous Membranes and Methods of Manufacturing These Membranes," there is described a method of manufacturing porous membranes which comprises starting from an emulsion of polytetrafluoroethylene, flocculating it by means of a coagulant so as to obtain a paste, applying this paste on a metal wire fabric in which it is fixed, for instance by rolling, so as to fill the meshes thereof and eliminating the coagulant substance, for instance by heating.

The object of the present invention is to provide a method for the obtainment of such membranes which is simpler than that above mentioned.

The essential feature of this improved method consists in obtaining the above mentioned paste by mixing a powder of polytetrafluoroethylene with at least one of the wetting substances of the group consisting of ethyl alcohol, methyl alcohol, isopropyl alcohol, butyl alcohol, isobutyl alcohol, isoamyl alcohol, cyclohexanol, acetone and acetic acid.

The above mentioned substances merely have a physical action. They serve to transform the polytetrafluoroethylene powder into a paste which can easily be applied on the supporting metal wire fabric, after which they are eliminated.

The respective proportions of the components of the mixture of polytetrafluoroethylene powder and wetting substance must be such that the paste formed by this mixture is easily spread on the metal wire fabric. This paste must be suitably deformable and homogeneous without being too fluid.

The method according to our invention is carried out as follows:

Polytetrafluoroethylene powder and in particular the powder commercially known as Du Pont de Nemours Teflon powder No. 6 (obtained from an emulsion of polytetrafluoroethylene) is thoroughly mixed with absolute alcohol in excess (for instance 100 gr. of this powder with 300 cm.$^3$ of alcohol).

When the paste thus obtained is quite homogeneous, the excess of alcohol is removed therefrom until it contains only about 40% by weight of alcohol.

This paste is then applied on a metal wire fabric, the whole being passed between rollers to give it the desired thickness and permeability as described in the above mentioned prior patent application, after which the wetting substance is eliminated by drying at suitable temperature.

Before the paste is applied on the metal wire fabric support it may be subjected to an ageing treatment. This treatment, which is intended to achieve a perfect impregnation of the Teflon powder by the wetting substance (alcohol) consists in immersing the paste in boiling alcohol, after which the excess of alcohol is removed from the paste so that it contains once more only about 40% by weight of alcohol.

Such a treatment ensures a slight extraction of organic impurities initially present in the starting material constituted by the polytetrafluoroethylene powder.

But we may further proceed to an extraction treatment proper of the paste by means of a solvent, either in a Soxhlet apparatus or in an extraction apparatus where the paste is constantly being stirred. Such a solvent is advantageously constituted by lukewarm alcohol.

The following table gives, by way of example, the characteristics of five samples of porous membranes made according to the invention:

| Samples | Thickness | Radius of the pores | Permeability |
|---|---|---|---|
| 1 | 40±5 | 1 | 58.10$^{-7}$ |
| 2 | 41±4 | 1 | 78.10$^{-7}$ |
| 3 | 40±2 | 1 | 78.10$^{-7}$ |
| 4 | 40±3 | 1 | 110.10$^{-7}$ |
| 5 | 39±2 | 2 | 112.10$^{-7}$ |

The thicknesses are given in hundredths of a millimeter, the radii in hundredths of a micron. The permeability is the number of gram-molecules diffusing through one cm.$^2$ of membrane, per minute, with a difference of pressure of one cm. of mercury between the opposed sides of the membrane.

Of course these characteristics depend upon the quality of polytetrafluoroethylene powder used as starting material, and in particular upon the grain size thereof.

What we claim is:
1. The method of making a porous membrane which comprises thoroughly mixing a powder of polytetrafluoroethylene with absolute ethyl alcohol in excess, so as to form a paste, removing the excess of alcohol from said paste so that it finally contains only about 40% by weight of alcohol, applying this paste on a corrosion resisting metal wire fabric, fixing said paste in and on said metal fabric to form a coating thereon and eliminating from this coating all chemical substances with the exception of polytetrafluoroethylene, this eliminating step being performed by drying at temperatures where the coating is porous.

2. The method according to claim 1 in which the paste thus formed is immersed in boiling ethyl alcohol, after which the excess of alcohol is again removed until the proportion of alcohol in the paste is only 40% by weight.

3. The method according to claim 1 in which the paste thus formed is treated by additional ethyl alcohol to extract therefrom the impurities initially present in the polytetrafluoroethylene powder.

4. A coating paste comprising essentially a mixture of powdery polytetrafluoroethylene and absolute ethyl alcohol, said alcohol being present in an amount of about 40 percent by weight of the paste.

References Cited in the file of this patent
UNITED STATES PATENTS

| | | |
|---|---|---|
| 2,710,266 | Hochberg | June 7, 1955 |
| 2,813,041 | Mitchell et al. | Nov. 12, 1957 |
| 2,866,721 | Hetherington | Dec. 30, 1958 |